United States Patent [19]
Parker et al.

[11] Patent Number: 5,892,646
[45] Date of Patent: Apr. 6, 1999

[54] GROUND FAULT PROTECTION OF GAS LAMP POWER SUPPLIES

[75] Inventors: Francis J. Parker, Cooper City; Emilian Padurariu, West Palm Beach; Richard Crawbuck, Jupiter, all of Fla.

[73] Assignee: Ventex Group, LLC, Riviera Beach, Fla.

[21] Appl. No.: 851,451

[22] Filed: May 5, 1997

[51] Int. Cl.[6] .................................................. H02H 3/00
[52] U.S. Cl. ................................................. 361/42; 361/93
[58] Field of Search ........................... 361/38, 42, 47, 361/49, 54, 55, 56, 57, 87, 93; 315/DIG. 7, 119, 127, 135, 225; 323/284; 363/50

[56] References Cited

U.S. PATENT DOCUMENTS

| | | | |
|---|---|---|---|
| 4,613,934 | 9/1986 | Pacholok | 315/DIG. 7 |
| 4,809,123 | 2/1989 | Allington et al. | 361/42 |
| 5,615,075 | 3/1997 | Kim | 361/87 |

*Primary Examiner*—Ronald W. Leja
*Attorney, Agent, or Firm*—Jay H. Maioli

[57] ABSTRACT

A power supply for powering a neon sign assembly includes a ground fault detection circuit having a current sensing circuit that produces a voltage that is proportional to the current that flows from a center tap of an output transformer, a phase-sensitive rectifier that receives output from the current sensing circuit and a reference voltage from the transformer and produces an output voltage that depends on the magnitude of the output from the current sensing circuit and the phase angle between the output from the current sensing circuit and the reference voltage, and an amplitude comparator that produces an output to a latch circuit only when an output voltage from the phase-sensitive rectifier is equal to or greater than a pre-set ground fault current limit.

15 Claims, 16 Drawing Sheets

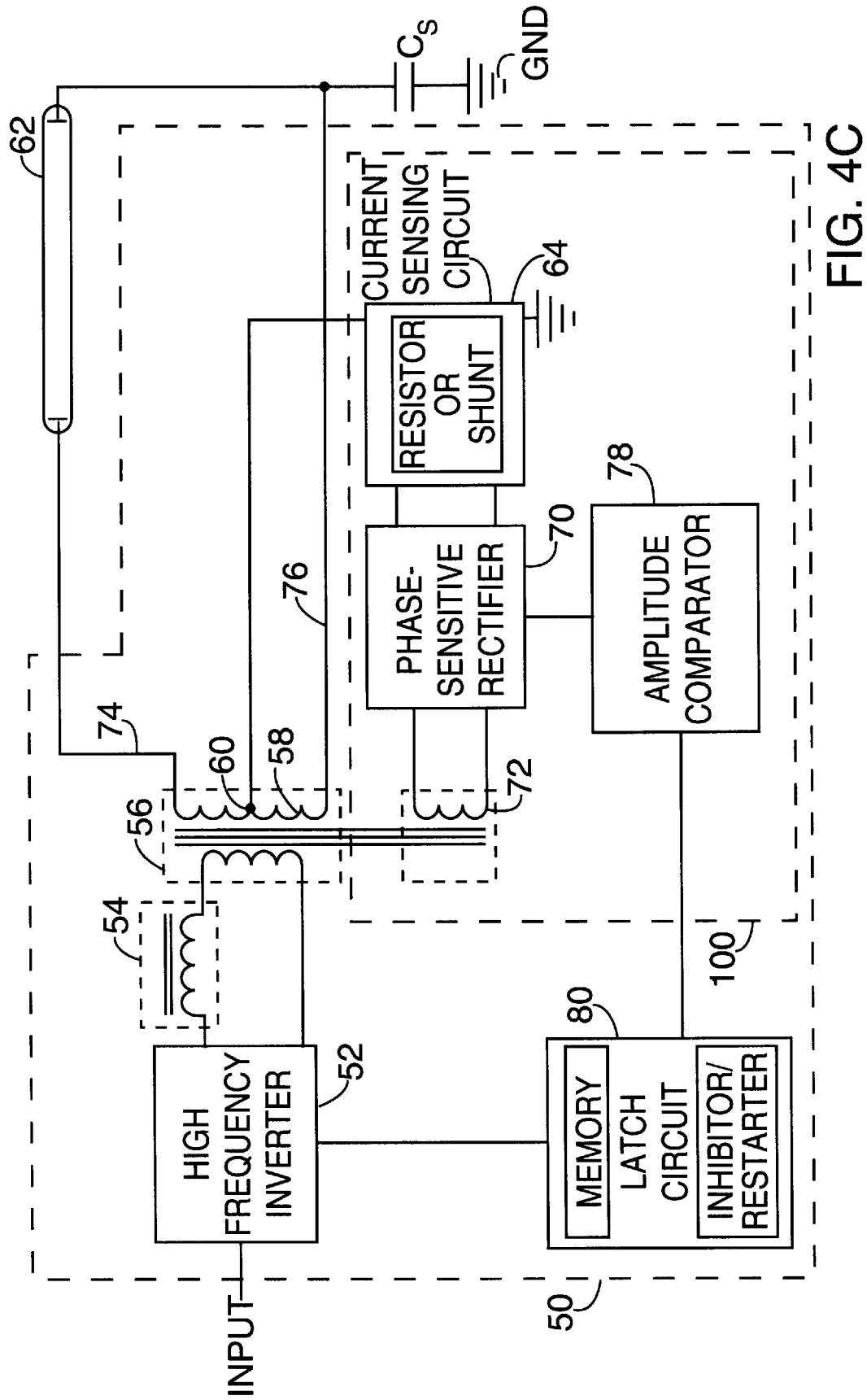

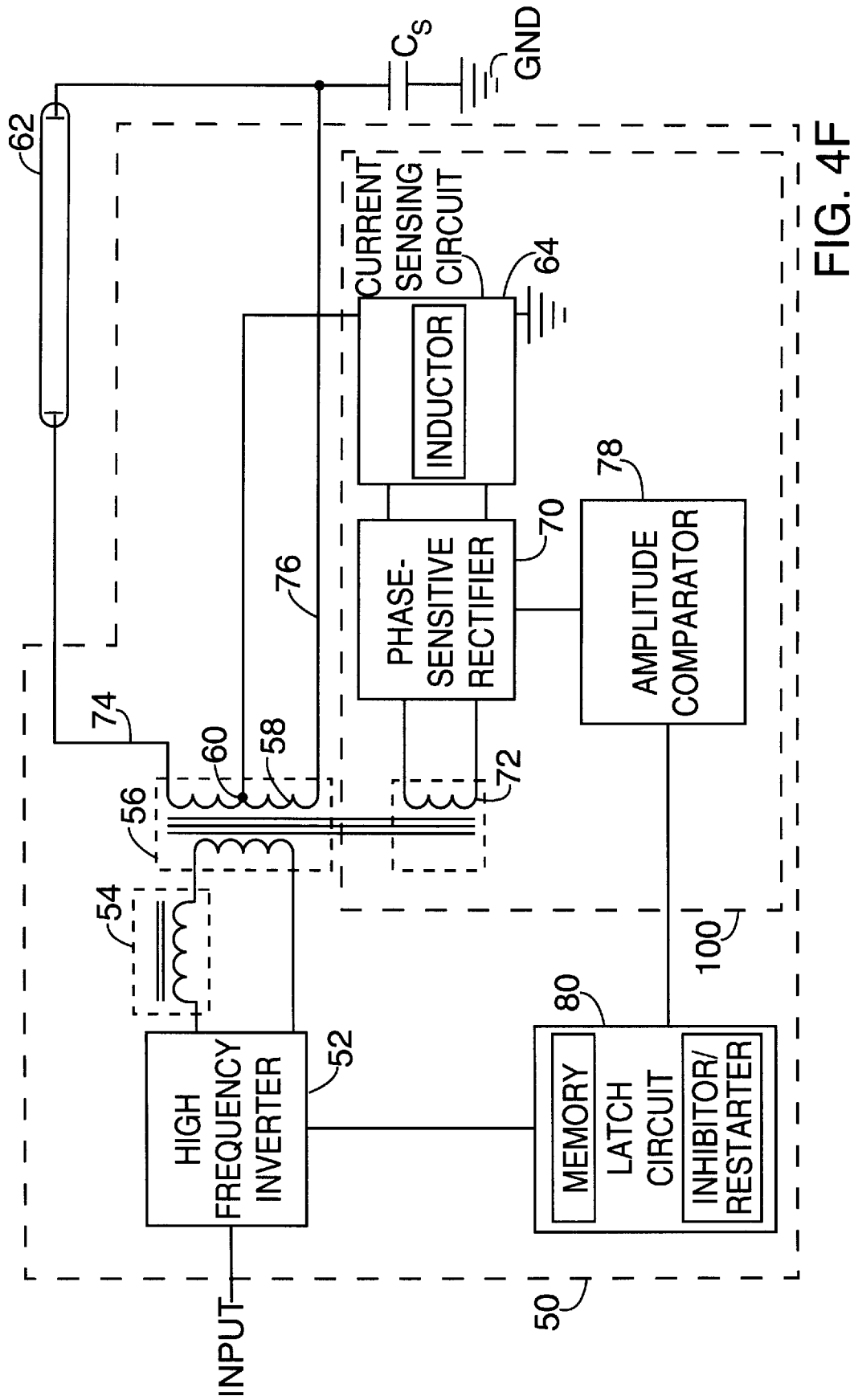

GROUND FAULT PROTECTION OF GAS LAMP POWER SUPPLIES

BACKGROUND

The present invention relates to power supplies for use with gas-discharge display lamps. More particularly, the present invention relates to power supplies for use with neon lamps for us e in neon signs and other purposes. It should be understood that the term "neon lamp" is used herein to refer to all gas-discharge lamps and is not limited to lamps that contain only neon gas.

In many countries the maximum voltage relative to ground which may be produced by a neon lamp power supply is limited by local regulatory requirements for each of the countries. It is, therefore, common practice to use a power supply that produces a balanced output voltage with respect to ground, in which the balanced output voltage contains two high-voltage AC outputs that differ in phase by 180°. FIG. 1 is a simplified circuit illustrating such a power supply 10, showing an AC current source 12 connected to a transformer 14 for powering a neon lamp or tube 16. The transformer 14 produces a balanced output voltage with respect to ground GND. Power supplies of this type may be used to power longer neon tube lengths than other conventional types of power supplies, without violating local regulatory requirements.

For a power supply that produces voltages above a certain defined minimum voltage, local regulatory requirements may also require that the power supply be provided with ground fault protection. The ground fault protection latches the power supply into an off state when current flowing to a ground return of the power supply exceeds a limit set by the local regulatory requirements.

An objective of having ground fault protection is to prevent an arc from the power supply to ground from igniting flammable materials and starting a fire. Ground fault protection may also be used as a safety measure for protecting humans from accidental injury by setting a ground fault current limit sufficiently low. Generally, such a ground fault current limit is at a level that is below typical current levels that a power supply would deliver to a neon tube.

One concern when using a neon tube power supply that operates at a high frequency in excess of 10 to 20 kHz is the stray capacitance produced in output leads connecting the power supply to the neon tube. Neon signs often include multiple neon tubes formed into a complex assembly of letters or artistic shapes and designs. A particular design of a neon sign may dictate that the output leads from the power supply have significantly different lengths. In addition, the neon sign itself may have significant capacitance between each of the neon tubes forming the neon sign and ground.

For example, FIG. 2 schematically shows a typical power supply 20 with a center-tapped transformer 24 driving a neon tube 26. The capacitors $C_s$ are shown in phantom to represent a sample distribution of stray capacitance to ground from the output leads 28, 30 of the power supply 20 and from the neon tube 26. Different lengths of output leads 28, 30 from the power supply 20 to the neon tube 26 will result in different values for the stray capacitance to ground of each output lead 28, 30, as indicated by a greater number of capacitors $C_s$ on the longer output lead 28 of FIG. 2.

In addition, a neon sign may have a particular layout that results in one end of the neon sign having a higher stray capacitance to ground than the other end of the sign. As shown in FIG. 3, if the neon sign 40 has an inner neon tube design 42 and an outer neon tube border 44, and the outer neon tube border 44 is located in close proximity to a grounded metal enclosure 46, the outer neon tube border 44 will have a higher stray capacitance to ground than the inner neon tube design 42, as indicated by the number of capacitors $C_s$ shown connected at various parts of the neon sign 40.

The effect of an unbalanced stray capacitance distribution, such as that shown in FIGS. 2 and 3, is to produce a capacitive current from the center tap of the transformer of the power supply to ground. This capacitive current can have a magnitude equal to or greater than the ground fault current limit or "trip point" at which the power supply is designed to automatically latch off in order to comply with local regulatory requirements. Therefore, the capacitive current produced as a result of stray capacitance can lead to "false trip" situations in which the power supply is latched off even though the capacitive current does not present the type of safety hazard as would an external arc.

To quantify the effect of the stray capacitance, values in excess of 50 picofarads have been observed in some commercial neon signs. If a neon sign has an imbalance or a difference in its capacitance to ground between two output leads of 35 picofarads, and the neon sign operates at 22 kHz and a voltage to ground of 3.5 kV RMS, then its ground fault current will be 16.9 mA. This current is above the trip level specified in UnderWriters Laboratories Specification UL2161, for example, which sets a limit for ground fault current of 15 mA.

Such a situation is not acceptable to users of high-frequency power supplies for neon lamps.

SUMMARY OF THE INVENTION

In view of the aforementioned considerations, the present invention provides a means for satisfying standard ground fault interruption requirements while minimizing the occurrence of false tripping.

An object of the present invention is to provide a power supply for powering a neon sign assembly. The power supply includes a ground fault detection circuit that latches off when a true ground fault current is detected, but remains operational in the presence of a stray current to ground caused by a capacitive imbalance in the neon sign assembly, thus reducing the occurrence of false tripping.

According to an aspect of the present invention, a power supply for powering a neon sign assembly includes a high-frequency inverter for converting an input current to a high-frequency alternating current, a center-tapped output transformer, a ground fault detection circuit, and a latch circuit for latching off the high-frequency inverter when a true ground fault current is detected. The ground fault detection circuit includes a current sensing circuit that produces a voltage that is proportional to the current that flows from the center tap of the transformer, a phase-sensitive rectifier that receives an output from the current sensing circuit and a reference voltage from the transformer and produces an output voltage that depends on the magnitude of the output from the current sensing circuit and the phase angle between the output from the current sensing circuit and the reference voltage, and an amplitude comparator that produces an output to the latch circuit only when an output voltage from the phase-sensitive rectifier is equal to or greater than a value corresponding to a pre-set ground fault current limit.

BRIEF DESCRIPTION OF THE DRAWINGS

FIGS. 4A to 4F respectively show a circuit for a power supply with ground fault protection according to an embodiment and preferred embodiments of the present invention;

DETAILED DESCRIPTION OF PREFERRED EMBODIMENTS

Figure 1:
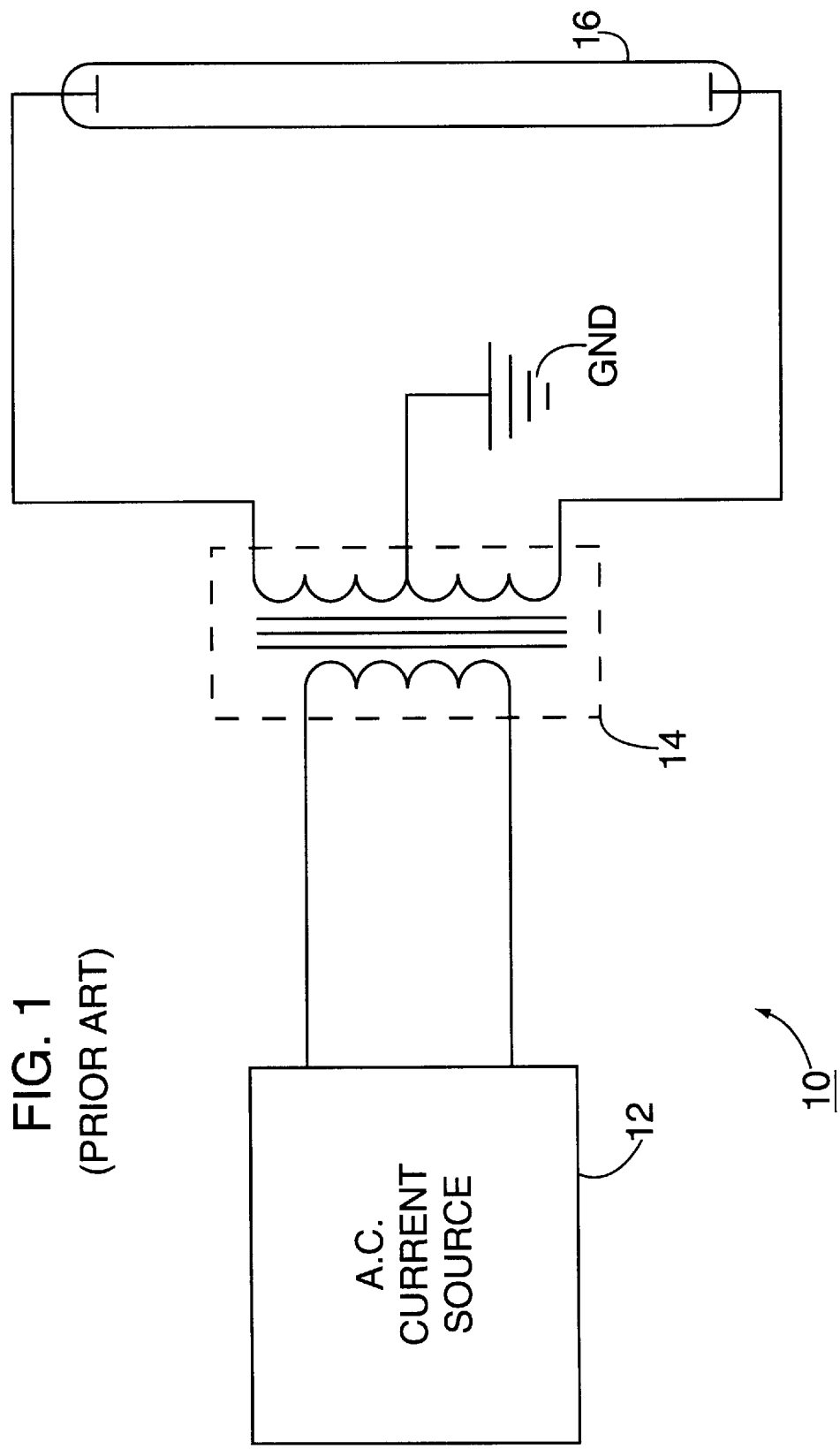
FIG. 1 shows a simplified circuit of a conventional power supply.
Figure 2:
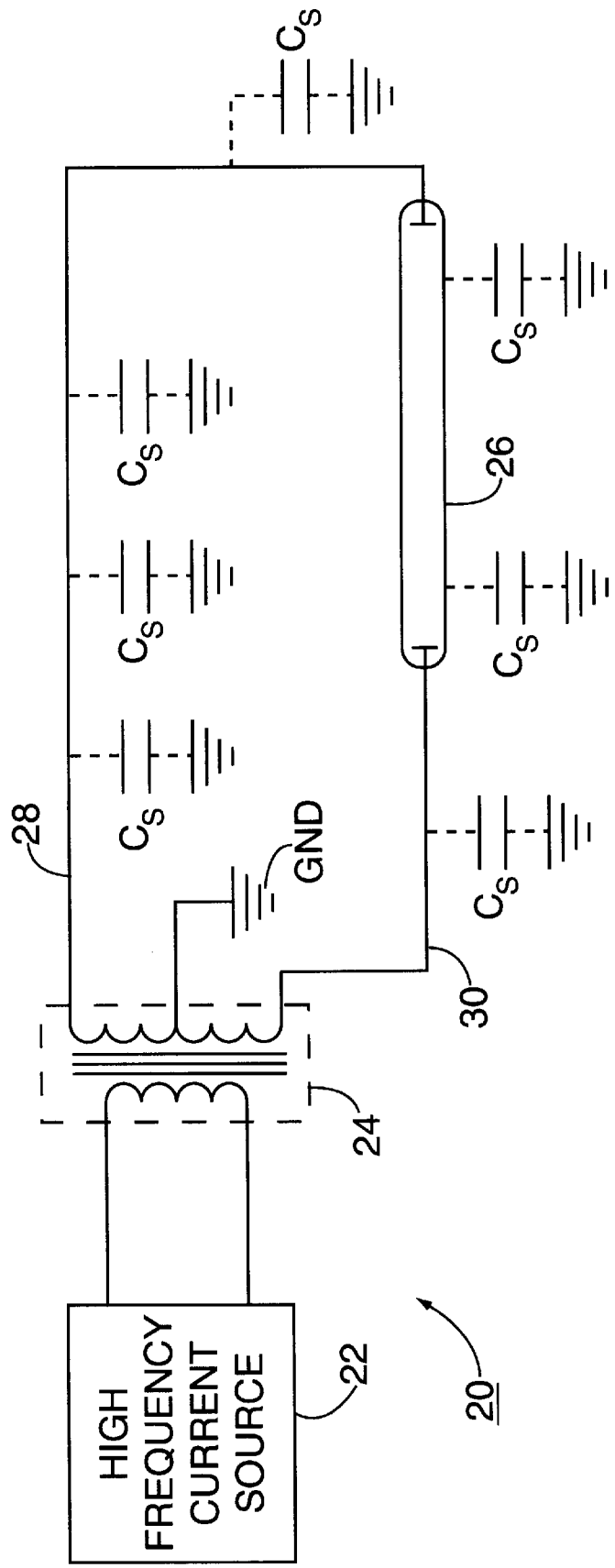
FIG. 2 shows a circuit of a conventional power supply with a center-tapped transformer.
Figure 3:
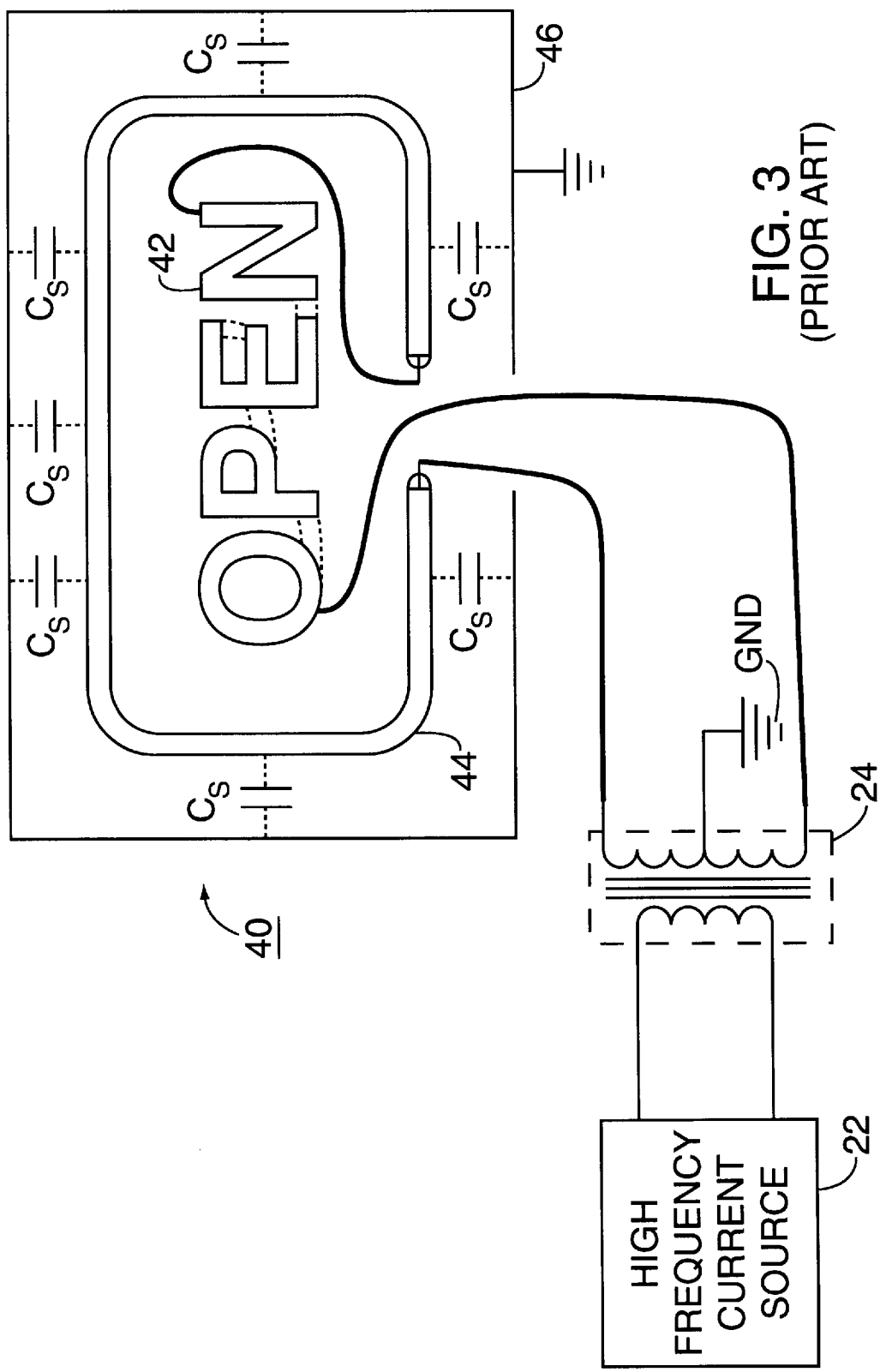
FIG. 3 shows a neon sign with stray capacitance.

Preferred embodiments of the present invention are described below with reference to the accompanying drawings, in which like reference numerals represent the same or similar elements.

Figure 4A:
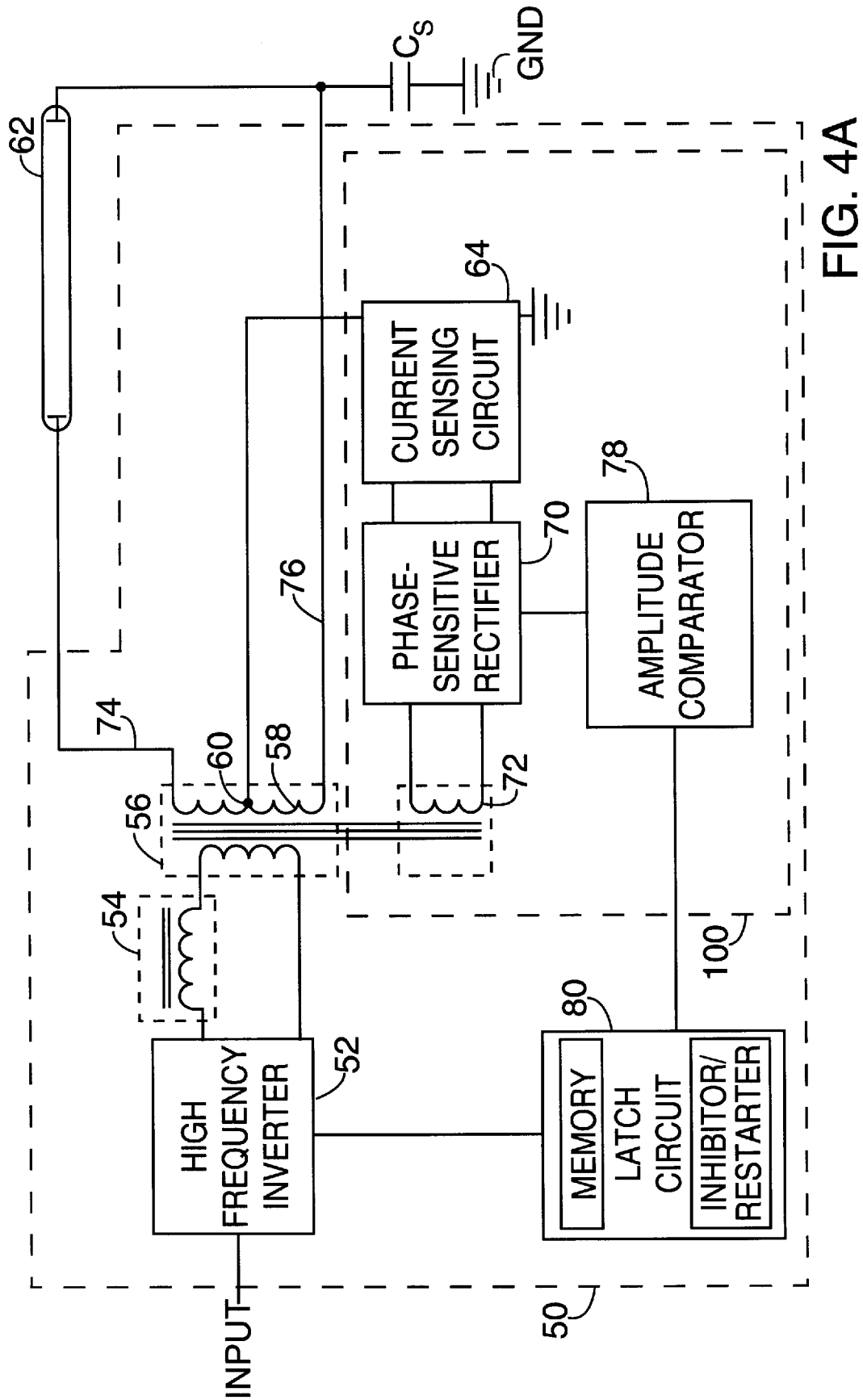

FIG. 4A is a schematic diagram of a power supply with ground fault interruption protection according to an embodiment of the present invention. Input current to the power supply 50 is converted to a high-frequency alternating current (AC) by a high-frequency inverter 52. Output from the inverter 52 is supplied via an inductor 54 to a transformer 56. The inductor 54 may be a discrete feed inductor or it may represent a leakage inductance associated with the transformer 56. The secondary winding 58 of the transformer 56 has a center tap 60, and the transformer 56 supplies a main output voltage for operating a neon tube 62. $C_s$ represents an unbalanced stray capacitance of the neon tube 62.

Figure 4B:
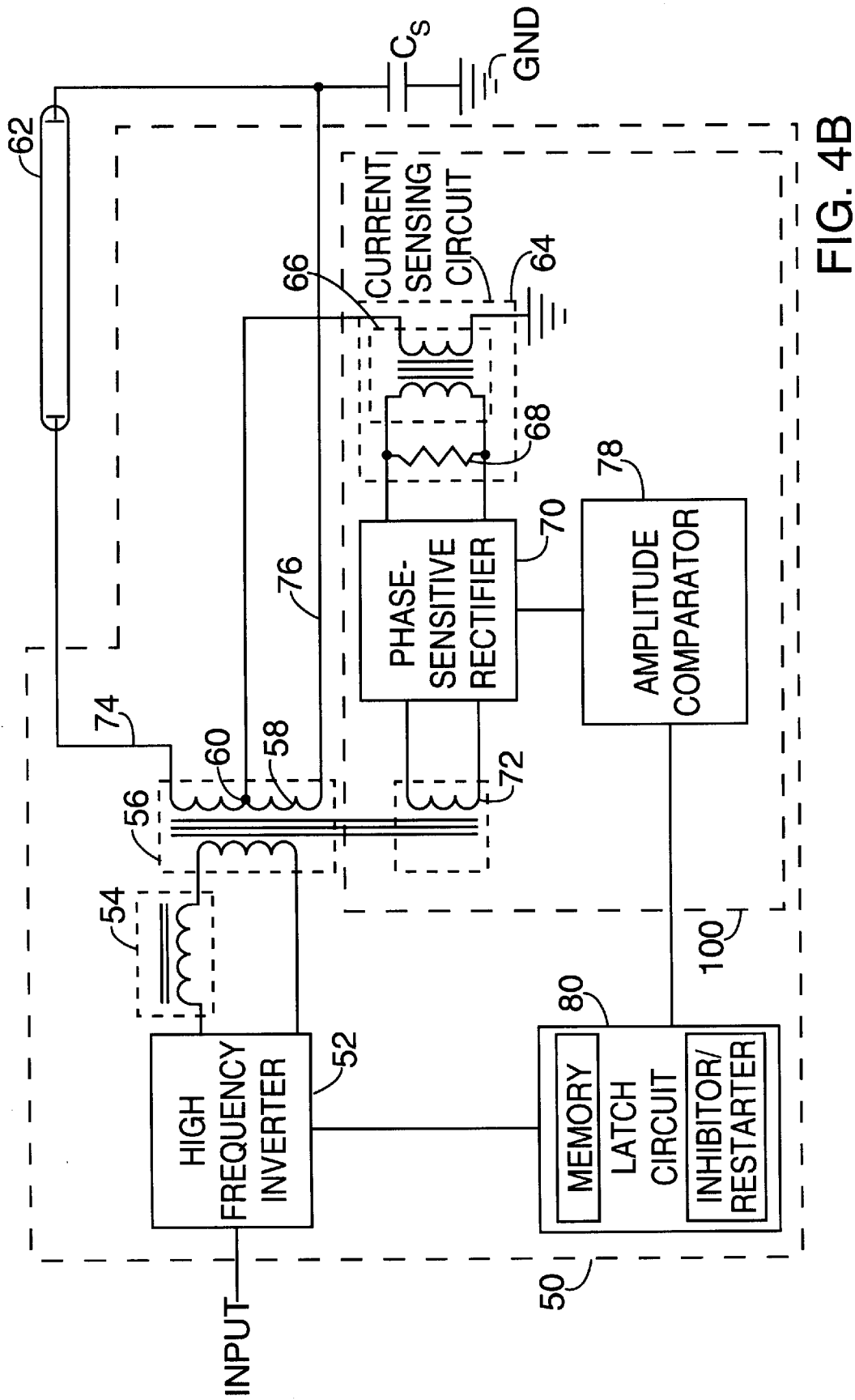
Figure 4D:
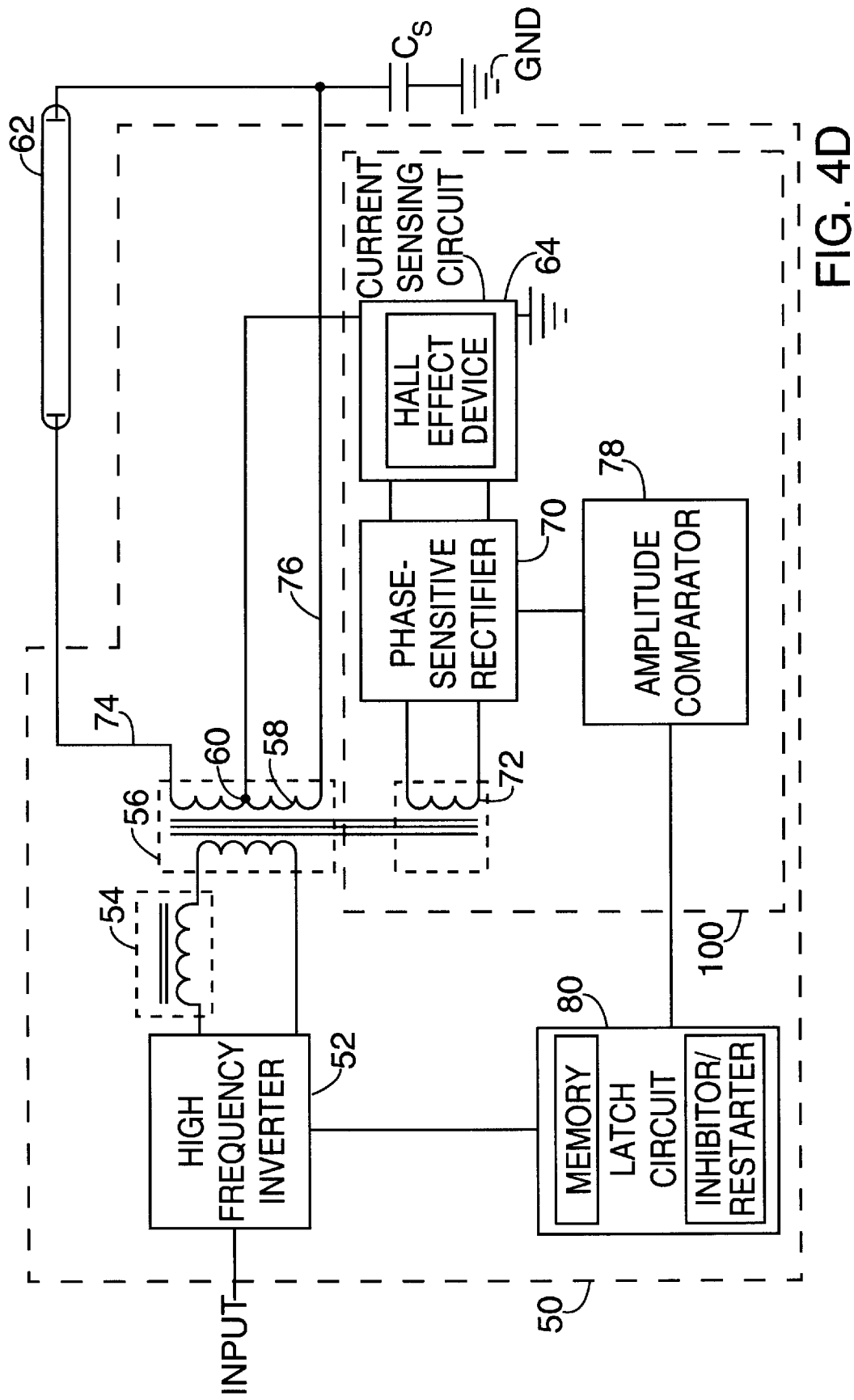
Figure 4E:
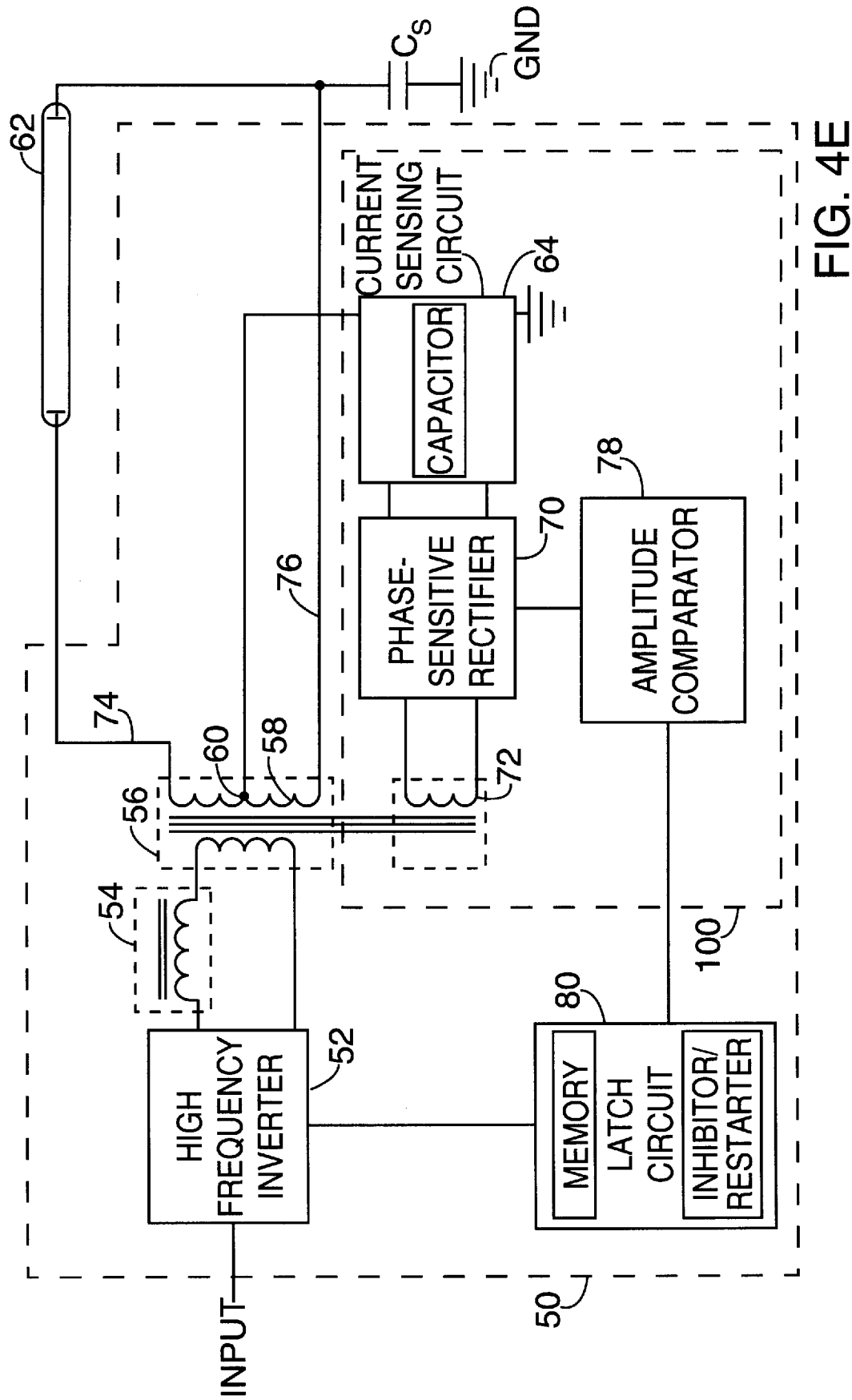

When an unbalanced stray capacitance $C_s$ is present, a current flows from the center tap 60 of the secondary winding 58 of the transformer 56 to a current sensing circuit 64 of a ground fault detection circuit 100. According to a preferred embodiment, the current sensing circuit 64 includes a current transformer 66 and a resistor 68, and allows for isolation of the power supply 50 from ground, as shown in FIG. 4B. As shown in FIGS. 4C to 4F, other circuit elements may also be used for sensing the current from the center tap 60 of the secondary winding 58 of the transformer 56, including a resistor, a current shunt, an inductor, a capacitor, a Hall effect device, or an optoelectronic isolator, each provided with suitable phase correction.

The current sensing circuit 64 produces a voltage that is proportional to the current that flows from the center tap 60.

In the absence of a load imbalance with respect to the neon tube 62, the current from the center tap 60 is zero. When a load imbalance is present, due to stray capacitance or due to a leakage current to ground from an output lead 74 or 76, the current from the center tap 60 is non-zero.

Output from the current sensing circuit 64 is supplied to a phase-sensitive rectifier 70. The phase-sensitive rectifier 70 is also supplied with a reference voltage produced in a winding 72 tightly coupled to the secondary winding 58 of the transformer 56. The phase of the winding 72 is, therefore, identical to that of the main output voltage from the transformer 56.

The phase-sensitive rectifier 70 produces an output voltage $V_o$ having a direct current (DC) magnitude given by $$V_o = V_s \cos\phi,$$

where $V_s$ represents an output from the current sensing circuit 64 and $\phi$ represents a phase angle between $V_s$ and the reference voltage in the winding 72.

For an actual or true ground fault current, which would result from an arc from one of the two output leads 74, 76 to ground, the current is essentially resistive in nature, and $\phi$ is approximately zero. The output from the phase-sensitive rectifier 70 is essentially that of a normal rectifier circuit, and a DC voltage is generated that is proportional to the current flowing from the center tap 60 of the secondary winding 58 of the transformer 56.

If a load imbalance due to stray capacitance occurs, the current flowing to ground from the center tap 60 is capacitive in nature and the phase angle is approximately ±90°.

Since the cosine of 90° is zero, it follows that the DC output voltage of the phase-sensitive rectifier 70 is zero or nearly zero for a capacitive load imbalance.

For a true ground fault condition, however, an imbalance in current between the two output leads 74, 76 results in a current flow from the center tap 60 of the transformer 56 which is in-phase or 180° out-of-phase with the reference voltage produced in the winding 72 coupled to the secondary winding 58 of the transformer 56. Thus, the DC output voltage of the phase-sensitive rectifier 70 has a finite positive or negative DC value that depends on its phase.

The output voltage of the phase-sensitive rectifier 70 is supplied to an amplitude comparator 78, which produces an output only when an input equal to or greater than a preset in-phase ground fault current limit is detected. Obviously, there is no output from the amplitude comparator 78 for a capacitive load imbalance.

The output from the amplitude comparator 78 is then used to activate a latch circuit 80, which is comprised of any circuit element that can be set to at least two states. In an unlatched state, the inverter 52 operates normally. In a latched state, after a true ground fault current is detected, the latch circuit 80 inhibits the normal operation of the inverter 52.

Optionally, the latch circuit 80 may include a memory for storing fault condition data from the amplitude comparator 78.

In summary, a true ground fault condition results in a current flow from a high voltage lead, such as one of the two output leads 74, 76, to ground, which results in an output from the phase-sensitive rectifier 70 that is of sufficient amplitude to produce an output from the amplitude comparator 78 to the latch circuit 80 which, in turn, inhibits normal operation of the inverter 52 by tripping a latch mechanism (not shown) of the latch circuit 80.

For the power supply 50 shown in FIGS. 4A to 4F a load imbalance due to normal levels of stray capacitance will not produce an output of sufficient amplitude to activate the amplitude comparator 78. Therefore, normal levels of stray capacitance will not inhibit normal operation of the power supply 50. As a result, problems associated with nuisance tripping caused by stray capacitance are obviated without compromising the ability of the power supply 50 to trip off in response to a true ground fault current that exceeds a predetermined current limit prescribed by regulatory requirements.

Figure 5:
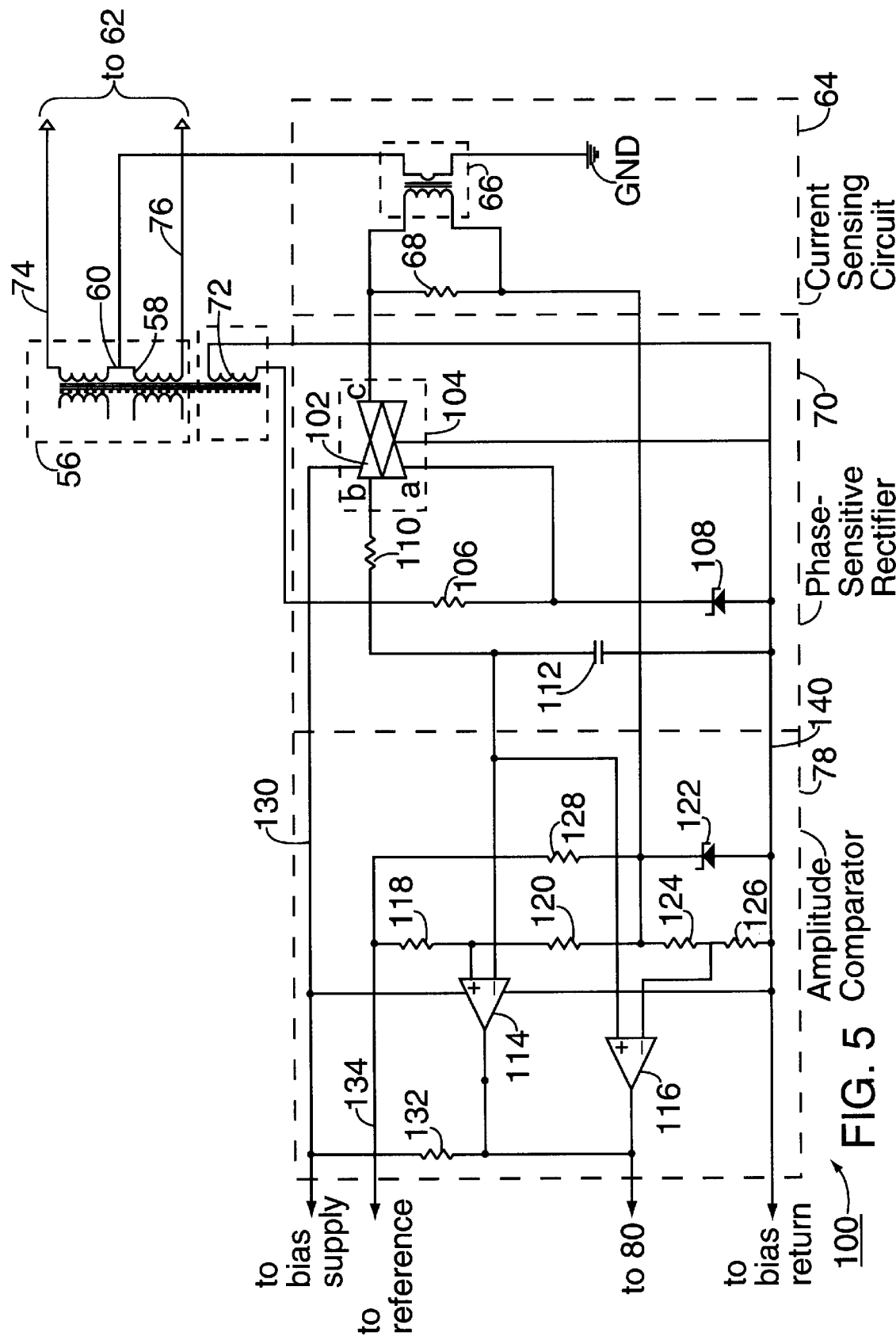
FIG. 5 shows an embodiment of a ground fault protection circuit with a half-wave configuration for the power supply of FIGS. 4A to 4F.

FIG. 5 shows a preferred embodiment of the ground fault detection circuit 100 of FIGS. 4A to 4F, including the current sensing circuit 64, the amplitude comparator 78, and the phase-sensitive rectifier 70. The phase-sensitive rectifier of FIG. 5 has a half-wave configuration.

The current sensing circuit 64 is the same as that shown in FIG. 4B. The output from the current sensing circuit 64 is a voltage proportional to the current that flows to ground from the center tap 60 of the secondary winding 58 of the transformer 56.

The phase-sensitive rectifier 70 includes an analog bi-directional gate 102. According to a preferred embodiment, the gate 102 comprises one input of a quadruple-input integrated circuit (IC) 104. Preferably, the IC is a 4066-type IC. Of course, other ICs of the same generic type are equally suitable.

In the phase-sensitive rectifier 70 of FIG. 5, if a gate voltage on the gate 102 is at or close to the bias supply voltage from a bias supply line 130, pin a is "high" and the gate 102 can conduct current between pin b and pin c. Preferably, the bias supply voltage is ±5 V. If the gate voltage is at or close to the bias return voltage, pin a is "low" and there is little or no conduction between pin b and pin c.

The gate voltage on the gate 102 at pin a is derived from the reference voltage produced in the winding 72, which is tightly coupled to the secondary winding 58 of the transformer 56 and is, therefore, in phase with the main output voltage from the transformer 56. A resistor 106 and a zener diode 108 serve to clip the gate voltage at or near the bias supply voltage and also serve to prevent the gate voltage from taking negative values, which would cause the gate 102 to malfunction. Preferably, the resistor 106 has a value of about 10 KΩ, and the zener diode 108 is an MMBZ5244B-type diode. In general, the reference voltage in the winding 72 has a sufficient amplitude that the gate voltage at pin a of the gate 102 closely approximates a rectangular waveform.

Figure 7:
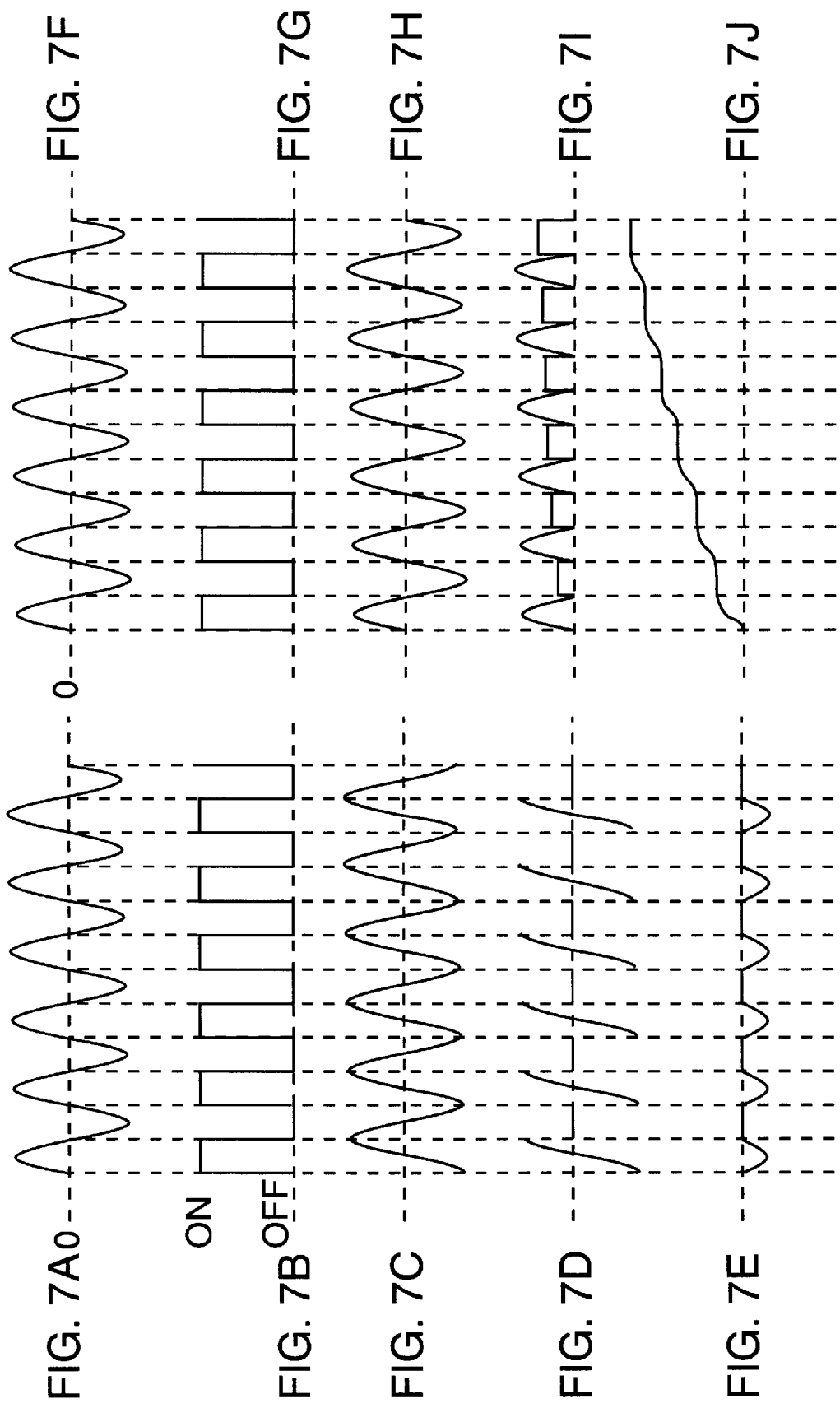
FIGS. 7A–7E are waveforms associated with a capacitive current imbalance.
FIGS. 7F–7J are waveforms associated with a true ground fault current.

FIGS. 7A–7E show typical idealized waveforms associated with the phase-sensitive rectifier 70 for a load with significant capacitive imbalance that produces a capacitve ground current. When the reference voltage if FIG. 7A is positive with respect to a base line, the gate voltage of the gate 102 is also positive, and there is conduction in both directions between pin b and pin c of the quadruple-input IC 104. FIG. 7B shows the gate voltage at pin a of the gate 102 cycling between an on state and an off state.

Due to the capacitive imbalance of the load, the ground current from the center tap 60 of the secondary winding 58 of the transformer 56 is 90° out-of-phase with the reference voltage, as depicted in FIG. 7C. An output of the phase-sensitive rectifier 70 at pin b of the gate 102 is the portion of the output from the current sensing circuit 64 that coincides with the positive excursion of the reference voltage, as shown in FIG. 7D. This is usually the last half of the negative portion of the reference voltage waveform, followed by the first half of the positive portion of the reference voltage waveform. Since the positive and negative portions of the waveform of FIG. 7D are of equal area, the average value of the output from pin b undergoes little or no change.

A resistor 110 and a capacitor 112 comprise a filter for filtering the output of the phase-sensitive rectifier 70, as shown in FIG. 5. For a sufficiently large RC time constant for the resistor 110 and the capacitor 112, the output at the capacitor 112 consists of a series of low-amplitude ripple pulses that have a negligible DC content. FIG. 7E represents a filtered output from the phase-sensitive rectifier 70. Preferably, the resistor 110 has a value of about 10 KΩ, and the capacitor 112 has a value of about 0.1 μF.

Since the output from the current sensing circuit 64 is bi-directional, the input and output of the gate 102 at pin b and pin c is also bi-directional. To prevent the input of the gate 102 from being reverse biased, the current sensing circuit 64 is provided with a finite pedestal or base voltage of sufficiently large magnitude, such as a voltage of 2.7 V, provided by the zener diode 108, for example. The actual base or pedestal voltage required for the phase-sensitive rectifier 70 of the ground fault detection circuit 100 depends on the design of the current sensing circuit 64 and the anticipated range of imbalance currents.

FIGS. 7F–7J show typical waveforms associated with the phase-sensitive rectifier 70 for a true ground fault current. As shown in FIGS. 7F and 7H a true ground fault current from the center tap 60 of the secondary winding 58 of the transformer 56 to ground is in phase with the reference voltage in the winding 72. FIG. 7G shows the voltage on pin a of the gate 102 cycling between an on state and an off state. The output at pin b of the gate 102, shown in FIG. 7I, consists only of the positive portions of the output from the current sensing circuit 64, shown in FIG. 7F, during the period when the gate 102 is open or when the gate voltage at pin a of the gate 102 is on. The output at pin b reverts to the voltage on the capacitor 112 when the gate 102 is closed or when the gate voltage at pin a of the gate 102 is off. Consequently, the voltage at the capacitor 112 climbs, as shown in FIG. 7J.

FIGS. 8A–8E show typical idealized waveforms associated with the phase-sensitive rectifier 70 for a load with a significant capacitive ground current that is 180° out-of-phase with the waveforms of FIGS. 7C–7E, corresponding to a ground fault in which the output leads 74, 76 are reversed. FIGS. 8F–8J show typical waveforms associated with a true ground fault current t hat is 180° out-of-phase with the waveforms of FIGS. 7H–7J.

Figure 8:
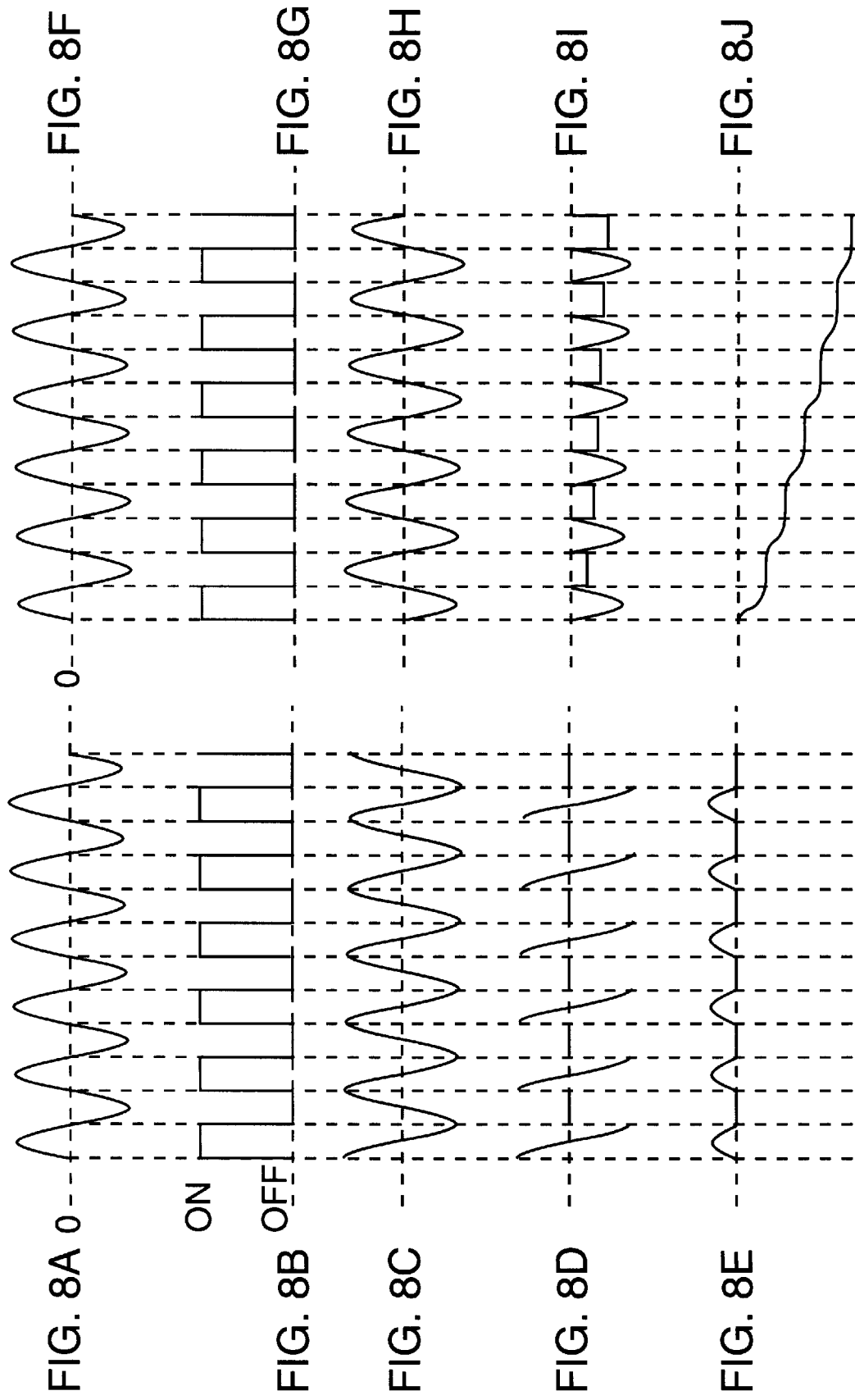
FIGS. 8A–8E are waveforms associated with a capacitive current imbalance that is 180° out-of-phase with the capacitive current imbalance shown in FIGS. 7A–7E.
FIGS. 8F–8J are waveforms associated with a true ground fault current that is 180° out-of-phase with the true ground fault current shown in FIGS. 7F–7J.

As shown in FIG. 8E, the capacitive imbalance again produces little or no DC offset, and the output of the phase-sensitive rectifier 70 across the capacitor 112 is negative for such a true ground current.

The amplitude comparator 78 must be able to respond to either a negative or a positive output from the phase-sensitive rectifier 70, corresponding to the ground fault conditions shown in FIGS. 7F–7J and FIGS. 8F–8J. This is accomplished by using two comparators 114, 116, as shown in FIG. 5. In the absence of a ground fault current, the combined output from the two comparators corresponds to the bias supply voltage. Resistors 118, 120 provide a DC offset bias to the non-inverting input of the comparator 114. Preferably, the DC offset bias is approximately ±1 V relative to a pedestal voltage of a zener diode 122 connected between the resistor 120 and a bias return line 140. The inverting input of the comparator 114 is connected to the filtered output from the phase-sensitive rectifier 70, between the capacitor 112 and the resistor 110. Preferably, the resistor 118 has a value of about 150 KΩ, the resistor 120 has a value of about 100 KΩ, and the comparators 114, 116 are LM339D-type comparators.

The inverting input of the comparator 116 is kept at approximately −1 V relative to the pedestal voltage of the zener diode 122 by means of resistors 124, 126. The non-inverting input of the comparator 116 is connected to the filtered output of the phase-sensitive rectifier 70, between the capacitor 112 and the resistor 110. Preferably, the resistor 124 has a value of about 100 KΩ and the resistor 126 has a value of about 150 KΩ.

A resistor 132 is connected between the outputs of the comparators 114, 116 and the bias supply line 130. Preferably, the resistor 132 has a value of about 10 KΩ. A resistor 128 is connected between the zener diode 122 and a reference line 134.

For a capacitive load imbalance, as long as the phase-sensitive rectifier 70 does not provide an output that falls outside the range of −1 V to +1 V, the output of the comparators 114, 116 will both be high or at the bias supply voltage.

For a true ground fault current, the voltage at the output of the phase-sensitive rectifier 70 exceeds the limit of +1 V such that one of the comparators 114, 116 conducts and the output from the comparators 114, 116 falls to near the bias return voltage or 0 V.

The change in the output level from the comparators 114, 116 may be used to drive the latch circuit 80 of FIG. 4. The latch circuit 80 may be comprised of any circuit element that can be triggered by a change in the output level from the amplitude comparator 78 and that remains latched when there is power available, such as a flip flop or a semiconductor relay (SCR), for example.

Alternatively, the output of the amplitude comparator 78 may be used to momentarily inhibit operation of the high-frequency inverter 52 to thereby activate an automatic restart process. The latch circuit 80 of FIGS. 4A to 4F may include a counter (not shown) or other means for limiting the number of times the power supply 50 may automatically restart. This alternative, however, may not be acceptable to some regulatory agencies.

Figure 6:
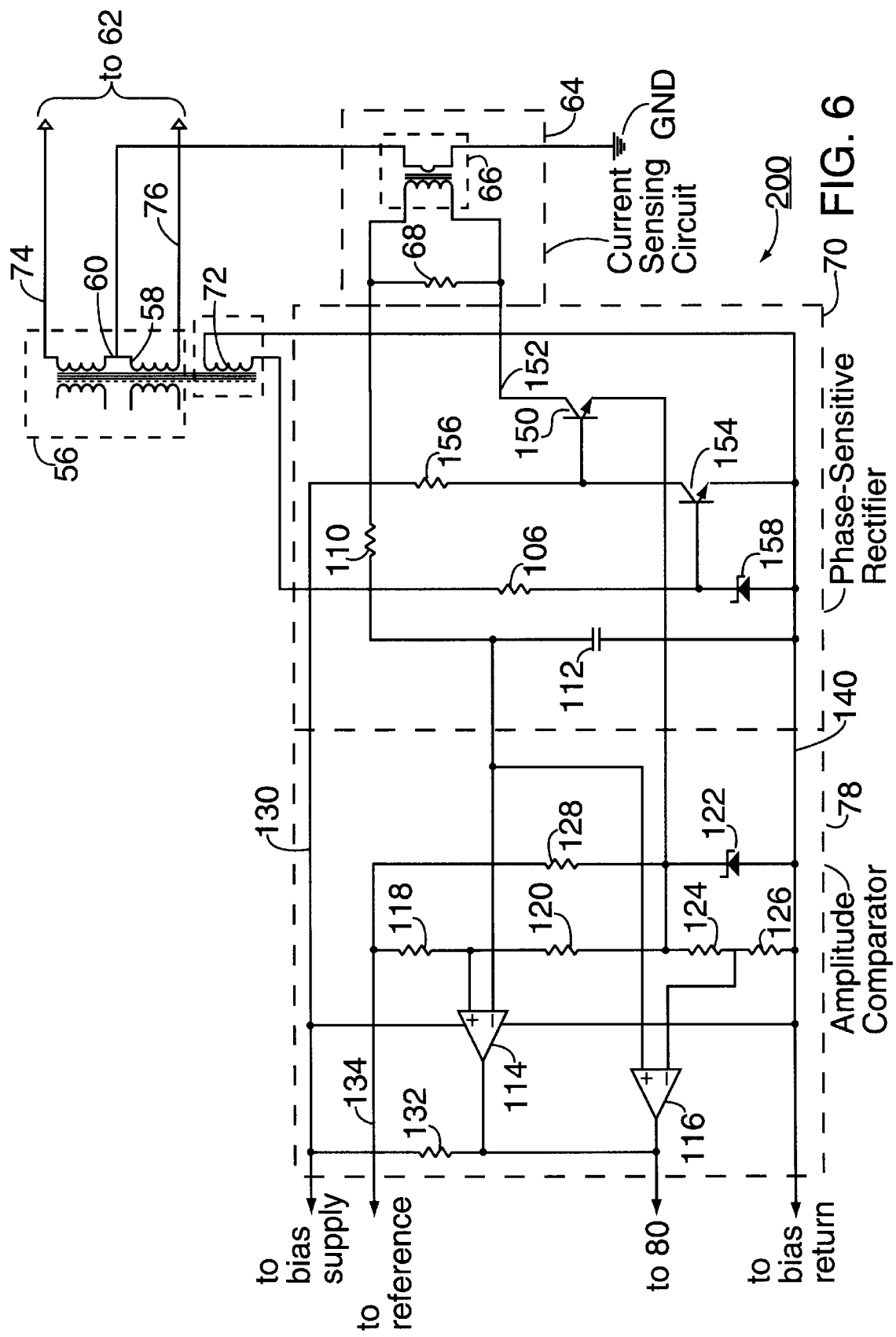
FIG. 6 shows another embodiment of a ground fault protection circuit with a half-wave configuration for the power supply of FIGS. 4A to 4F.

Another embodiment of the ground fault detection circuit 100 of FIGS. 4A to 4F is schematically shown as the ground fault detection circuit 200 FIG. 6. FIG. 6 is essentially similar to FIG. 5, but the half-wave phase-sensitive rectifier 70 of FIG. 6 includes an NPN transistor 150 connected to a return line 152 of the current sensing circuit 64 instead of the analog bi-directional gate 102 of FIG. 5. The reference voltage of the winding 72 is supplied through the resistor 106 to the base of a second NPN transistor 154. In general, current into the base of the second transistor 154 is sufficiently large that the second transistor 154 is over driven and output at the collector of the second transistor 154 is essentially a square wave opposite in phase to the bias supply voltage. The output from the second transistor 154 is supplied to the base of the first transistor 150 to gate or turn the first transistor 150 on and off. Preferably, the first and second transistors 150, 154 are MMBT2222A-type transistors.

When the second transistor 154 is on or conducting, the base of the first transistor 150 is below the pedestal voltage of the zener diode 122 to which the emitter of the first transistor 150 is connected and, therefore, the first transistor 150 is non-conducting. As a result, there is no net change in the voltage at the capacitor 112.

When the second transistor 154 is off or non-conducting, a resistor 156 turns the first transistor 150 on. Preferably, the resistor 156 has a value of about 10 KΩ. if the output from the current sensing circuit 64 has a greater voltage the voltage at the capacitor 112, then current may flow through resistor 110 to charge the capacitor 112. If the voltage from the current sensing circuit 64 is less than the voltage at the capacitor 112, however, then the capacitor 112 discharges through the resistor 110. This is due to the inherent diode-like nature of reverse-biased collector-base junctions. The zener diode 108 of FIG. 5 is replaced with a diode 158 that is preferably an MMBD914-type diode in FIG. 6. The remainder of the ground fault detection circuit 200 of FIG. 6 operates in a similar manner as that of FIG. 5.

The waveforms of FIGS. 7A–7J and 8A–8J may be used to understand the ground fault detection circuit 200 of FIG. 6, with the exception that the phase of the reference voltage shown in FIGS. 7A, 7F, 8A, and 8F is changed by 180° due to the inversion of the second transistor 154. Referring to FIGS. 7B, 7G, 8B, and 8G, the gate voltage output from the second transistor 154 is supplied to the base of the first transistor 150. As in FIG. 5, the phase-sensitive rectifier 70 provides a filtered output from the junction between the capacitor 112 and the resistor 110.

The ground fault detection circuit 200 of FIG. 6 is slightly less costly to make than the circuit 100 of FIG. 5, but the circuit 200 of FIG. 6 lacks the precision of the circuit 100 of FIG. 5. Nevertheless, the ground fault detection circuit 200 of FIG. 6 has been found to provide adequate ground fault protection.

Under certain circumstances, one of the two output leads from a neon tube power supply may become disconnected without producing an arc to ground. This can occur, for example, in a neon sign consisting of multiple neon tubes, when one of the neon tubes becomes broken. The effect of such an occurrence is to produce a substantially greater amount of light from an end of a neon tube connected to the remaining lead from the power supply. The current return path that completes the circuit path for the power supply is satisfied by the stray capacitance of the tube to ground.

With such a single-lead operation as described above, the ground fault current is largely capacitive and may be of significant amplitude. With respect to the ground fault detection circuits 100, 200 of FIGS. 5 and 6, the relatively low pedestal voltage of the respective diodes 108, 158 results in clipping of the negative portion of the output from the phase-sensitive rectifier 70, shown in FIGS. 7D, 7I, 8D, and 8I. This results in a positive output supplied by the phase-sensitive rectifier 70 to the amplitude comparator 78, which enables the amplitude comparator 78 to produce a signal that can latch the high-frequency inverter 52 of FIGS. 4A to 4F into an off state.

It should be understood that the applicability of the ground fault detection circuits 100, 200 for specific ground fault conditions is determined by the characteristics of each element of the circuits 100, 200. In other words, the characteristics of the elements used in the circuits 100, 200 will set a limit on the capacitive current imbalance that the circuits 100, 200 can handle without latching or tripping.

Figure 9:
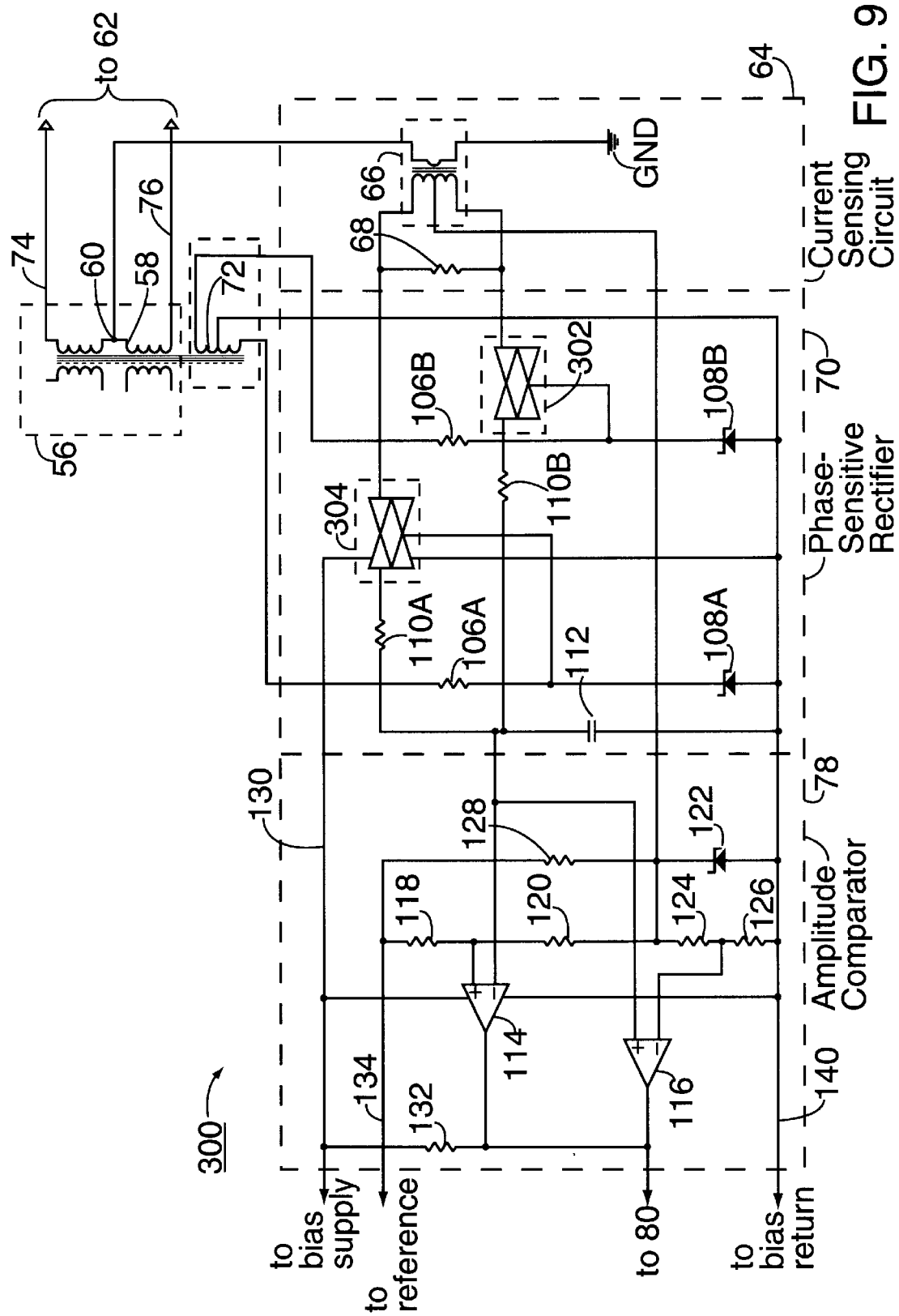
FIG. 9 shows an embodiment of a ground fault detection circuit with a full-wave configuration for the power supply of FIGS. 4A to 4F.
Figure 10:
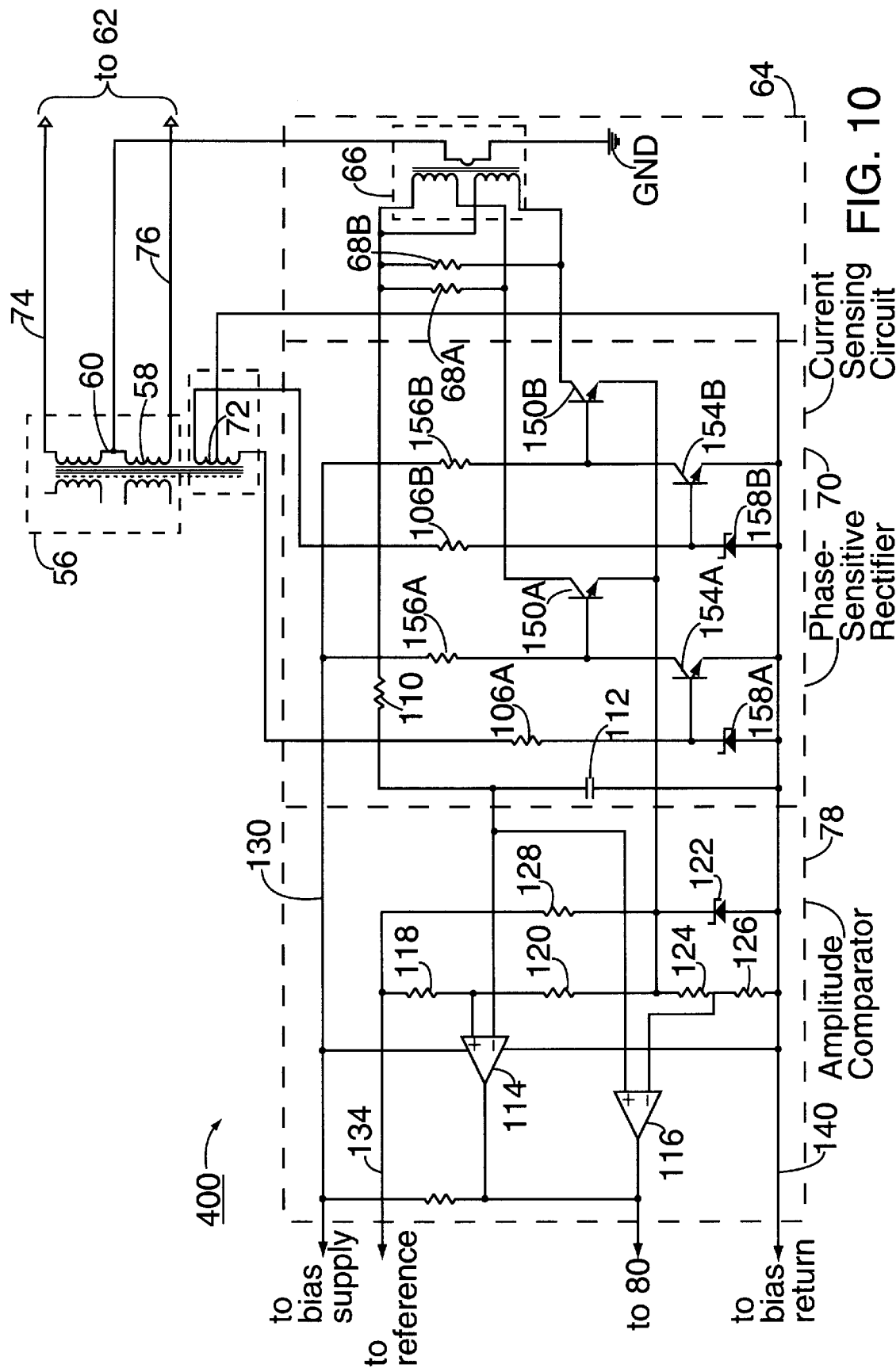
FIG. 10 shows another embodiment of a ground fault detection circuit with a full-wave configuration for the power supply of FIGS. 4A to 4F.

The ground fault detection circuits of FIGS. 5 and 6 may both be configured to produce a full-wave rectified output using the circuits 300, 400 shown in FIGS. 9 and 10, respectively. Specifically, the phase-sensitive rectifier 70 of FIG. 9 includes two quadruple-input ICs 302, 304 operating as analog bi-directional gates connected in series, and the phase-sensitive rectifier 70 of FIG. 10 includes two sets of NPN transistors 402, 404, 406, 408 connected in series. The main advantage of the full-wave rectified circuits 300, 400 is their increased sensitivity and speed of operation over the circuits 100, 200 of FIGS. 5 and 6. However, these advantages generally will not warrant the increased cost and complexity of the full-wave rectified circuits 300, 400.

Figure 11:
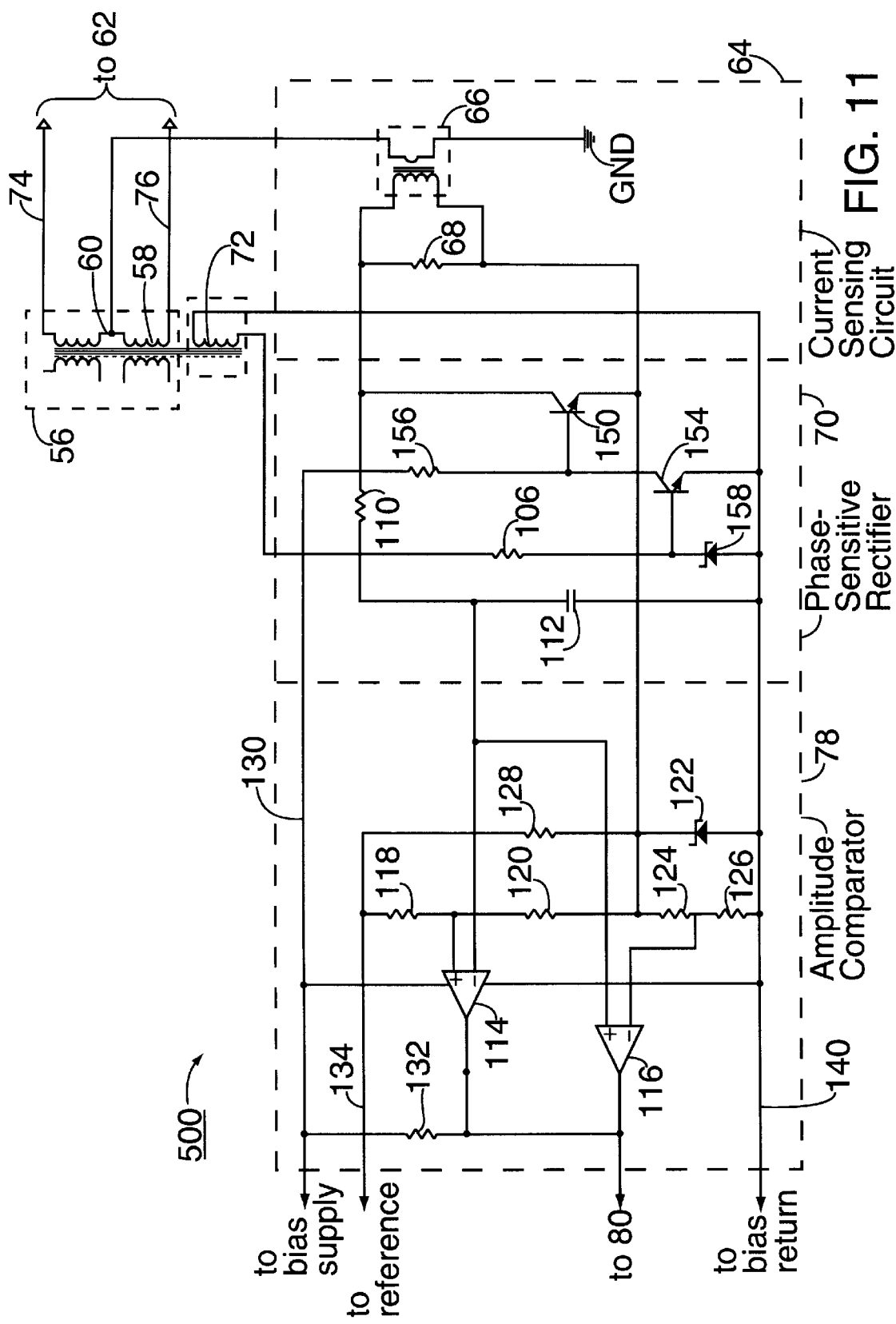
FIG. 11 shows an alternative embodiment of a ground fault detection circuit for the power supply of FIGS. 4A to 4F.

Optionally, the ground fault detection circuit 200 of FIG. 6 can be configured with the second transistor 154 used as a shunt switch, as is shown in the circuit 500 of FIG. 11. This configuration results in decreased sensitivity, and generally does not offer any significant advantage over the series configuration of FIG. 6.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. A ground fault protection apparatus for a power supply having a transformer, the apparatus comprising:

a current sensing element for producing a voltage proportional to a current from a center tap of the transformer;

a phase-sensitive rectifier for producing a voltage $V_o$ based on a reference voltage from the transformer and the voltage from the current sensing element;

an amplitude comparator for producing an output when the voltage from the phase-sensitive rectifier is equal to or greater than a pre-set value corresponding to a ground fault current limit, the amplitude comparator including a first comparator for responding to a positive voltage from the phase-sensitive rectifier and a second comparator for responding to a negative voltage from the phase-sensitive rectifier; and a latch circuit for inhibiting operation of the power supply when the output from the amplitude comparator is supplied thereto, wherein the voltage produced by the phase-sensitive rectifier corresponds to $$V_o = V_s \cos\phi,$$

where $V_s$ represents the output from the current sensing element and $\phi$ represents a phase angle between $V_s$ and the reference voltage from the transformer.

2. An apparatus according to claim 1, wherein the current sensing element comprises a current transformer and an associated resistor.

3. An apparatus according to claim 1, wherein the current sensing element comprises one of a resistor or a current shunt.

4. An apparatus according to claim 1, wherein the current sensing element comprises a Hall effect device.

5. An apparatus according to claim 1, wherein the current sensing element comprises a capacitor.

6. An apparatus according to claim 1, wherein the current sensing element comprises an inductor.

7. An apparatus according to claim 1, wherein the phase-sensitive rectifier is configured as a half-wave rectifier and includes an analog bi-directional gate circuit.

8. An apparatus according to claim 1, wherein the phase-sensitive rectifier is configured as a full-wave rectifier and includes an analog bi-directional gate circuit.

9. An apparatus according to claim 1, wherein the phase-sensitive rectifier is configured as a half-wave rectifier and includes a transistor operating as a gate.

10. An apparatus according to claim 1, wherein the phase-sensitive rectifier is configured as a full-wave rectifier and includes a transistor operating as a gate.

11. An apparatus according to claim 1, wherein the amplitude comparator outputs fault condition data, and the latch circuit includes a memory for storing the fault condition data.

12. An apparatus according to claim 1, wherein the output from the amplitude comparator causes the latch circuit to temporarily inhibit the operation of the power supply to enable the power supply to automatically restart.

13. An apparatus according to claim 12, wherein the latch circuit includes limiting means for preventing the power supply from automatically restarting when the power supply has been automatically restarted a pre-defined number of times.

14. An apparatus according to claim 1, wherein the phase-sensitive rectifier produces an output indicating a capacitive imbalance based on a magnitude and polarity of the voltage from the current sensing element, and the output from the phase-sensitive rectifier causes the amplitude comparator to supply an output signal to the latch circuit.

15. A method of protecting a power supply including a transformer from ground faults, the method comprising the steps of:

determining a current from a center tap of the transformer;

converting the current from the center tap of the transformer to a voltage;

obtaining a reference voltage from the transformer;

producing a rectified voltage based on the converted voltage and the obtained reference voltage;

supplying the rectified voltage to a first comparator when the voltage is a positive voltage;

supplying the rectified voltage to a second comparator when the voltage is a negative voltage; and feeding a signal output from the first comparator or the second comparator to a latch circuit to inhibit operation of the power supply when the rectified voltage is greater than a predetermined limit that corresponds to a ground fault current limit, wherein the rectified voltage discriminates between a true ground current and a current due to capacitive imbalance based on a phase angle between the converted voltage and the reference voltage.

* * * * *